(12) United States Patent
Yost

(10) Patent No.: US 6,826,361 B1
(45) Date of Patent: Nov. 30, 2004

(54) SYSTEMS AND METHODS FOR ESTIMATING LENS TEMPERATURE

(75) Inventor: Jason E. Yost, Windsor, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/747,456

(22) Filed: Dec. 29, 2003

(51) Int. Cl.[7] ............................................. G03B 13/36
(52) U.S. Cl. ........................................ 396/97; 348/345
(58) Field of Search ............................ 396/97; 348/345

(56) References Cited

U.S. PATENT DOCUMENTS 4,650,309 A * 3/1987 Ishida et al. ................. 396/97
6,268,885 B1 * 7/2001 Ohta ......................... 348/345

* cited by examiner

Primary Examiner—W. B. Perkey

(57) ABSTRACT

A system and method for estimating lens temperature is disclosed. In one embodiment, a camera comprises a body and a lens assembly. The lens assembly comprises a focus mechanism. The body comprises a heat generating element, a sensor proximally located to the heat generating element, and a processor. The sensor is configured to provide a signal responsive to temperature. The processor is configured to apply an input responsive to the signal to a heat transfer model to determine a temperature of the lens assembly. The processor further determines a focus error correction responsive to the temperature of said lens assembly.

36 Claims, 8 Drawing Sheets

SYSTEMS AND METHODS FOR ESTIMATING LENS TEMPERATURE

BACKGROUND

Lens assemblies used with today's cameras generally incorporate both an automatic focus function and a zoom function. The zoom function is provided by a zoom lens that is generally controlled by a direct current (DC) motor that changes the relationship among the lens components to enable magnification of the image. The focus function is provided by a focus lens, which is generally actuated by a stepper motor that controls the relative positioning of lens assembly components to bring the subject into focus at an image plane. The two functions of focus and zoom are related in that if the zoom changes, the focus also generally changes in a proportional manner.

Generally, the focus steps provided by the stepper motor are related to the focus distance over which the lens is designed to operate. For example, in a macro photograph implementation, the lens may have a focus range of, for example, 100 to 1000 millimeters (mm). This focus range generally corresponds to a number of steps through which the focus motor causes the lens to move to achieve focus. For example, a focus range of 100–1000 mm may equate to focus steps of 20–40, with 0 being what is referred to as the "home" position of the lens.

In a typical implementation, the zoom function is actuated by a user of the camera to generally frame the subject of the image to be captured. Once the zoom function is completed, the focus function is activated by, for example, by partially pressing a shutter-actuating button on the camera.

A common focus mode is to move the focus lens into a fixed position where objects that are far away, referred to as at an "infinite" distance, are in focus. This mode allows users to capture an image of a distant subject without going through a focus process. The exact position of the focus motor for this mode can be calibrated at the lime the camera is manufactured.

Other calibrations are also performed when the camera is manufactured. For example, a relationship between a focus search range (i.e., the number of steps to scan a focus mechanism) to ensure proper focus of the lens over a focus range (i.e., 100–1000 mm as described above) is generally set during the manufacturing process. However, during operation, the camera is subject to operational temperatures that may vary significantly from the temperature at which the camera and its focus mechanism were calibrated. As the temperature of the camera and the lens changes, the relationship among the components that comprise the lens changes as well. Consequently, if a focus mechanism relies solely on calibrated relationships to focus the lens, operational temperatures that vary from the temperature of the lens during calibration will cause the calibrated position to be inaccurate. As a result, captured images will be out of focus.

To account for temperature related focus errors, camera designers generally apply a liberal search range through which the focus motor adjusts components of the lens to ensure that a subject-of-interest at a given focus range can be properly focused. Accordingly, this results in the need to expand the range of steps through which the lens motor must step to achieve acceptable focus for a given focus range. Unfortunately, expanding the range of steps through which the focus motor must adjust the lens increases the time it takes to achieve an acceptably focused image of the subject-of-interest, thereby increasing the amount of time required to capture an image. This delay in achieving a focused image is bothersome to a user of the camera.

Therefore, it is desirable to reduce the amount of time consumed in achieving focus with a lens coupled to a camera and in positioning a lens so that distant subjects are in focus without additional adjustment.

SUMMARY

Systems and methods for estimating lens temperature in a camera are invented and disclosed. In one embodiment, a method for estimating the temperature of a camera lens, comprises the steps of sensing temperature at a location within the body of a camera, monitoring the occurrence and duration of or/off operating states of heat generating elements of the camera, and using the temperature at a location within the body of the camera and monitored occurrence and duration of on/off operating states of heat generating elements within the camera body to determine a current temperature of a lens assembly coupled to the camera.

BRIEF DESCRIPTION OF THE DRAWINGS

The present camera and methods for estimating lens temperature, as defined in the claims, can be better understood with reference to the following drawings. The components within the drawings are not necessarily to scale relative to each other, emphasis instead being placed upon clearly illustrating the principles of the systems and methods for estimating lens temperature.

DETAILED DESCRIPTION

Figure 1:
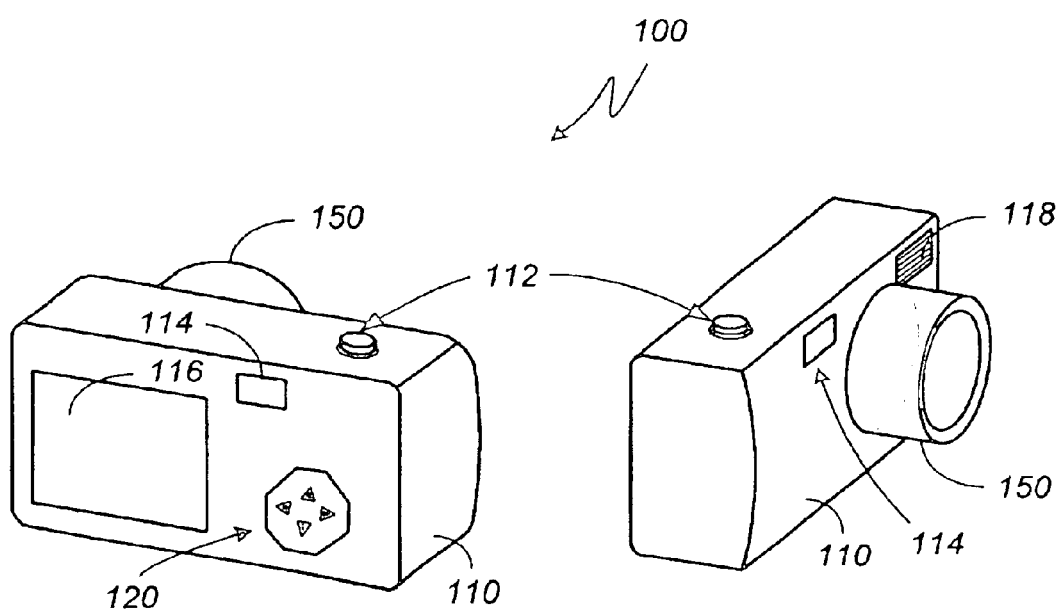
FIG. 1 is a perspective view illustrating a camera.

While described below with particular reference to an embodiment resembling a digital camera, the present systems and methods can be applied in film cameras that include internal heat generating elements and a lens assembly. The systems and methods for estimating lens temperature can be implemented using combinations of hardware, software, or firmware. In the illustrated embodiment(s), the systems and methods for estimating lens temperature are implemented using a combination of hardware and software that is stored in an internal memory and that is executed by a suitable instruction execution system provided within an application specific integrated circuit (ASIC).

Hardware components of the systems for estimating a lens temperature can be implemented with any or a combination of the following technologies, which are all well known in the art: a discrete logic circuit(s) having logic gates for implementing logic functions upon data signals, an application specific integrated circuit (ASIC) having appropriate combinational logic gates (as described in the illustrated embodiment), a programmable gate array(s) (PGA), a field programmable gate array (FPGA), etc.

Software or firmware components of the systems for estimating a lens temperature can be stored in one or more memory elements and executed by a suitable general purpose or application specific processor. Software or firmware for estimating lens temperature, which comprises an ordered listing of executable instructions and data for implementing logical functions, can be embodied in any computer-readable medium for use by, or in connection with, an instruction execution system, apparatus, or device, such as an appropriately configured processor-containing camera or other system that can fetch the instructions from the instruction execution system and execute the instructions. While illustrated embodiments of the present systems and methods do not include operation with a computer, those of ordinary skill will understand that software or firmware components of the systems for estimating a lens temperature can be stored on and later read from a computer-readable medium. In the context of this document, a "computer-readable medium" can be any means that can contain, store, communicate, propagate, or transport the program for use by or in connection with the instruction execution system.

The temperature of a lens assembly is estimated using a mathematical model of the body of a camera and the lens assembly. In the model, camera electronics are sources of heat and the lens assembly and environment surrounding the camera are heat sinks. A portion of the heat generated by the camera electronics warms the lens assembly relative to the ambient air temperature. When the camera is in a power saving mode or off, the lens assembly loses heat and its temperature approaches the ambient air temperature.

One or more temperature sensors are located within the body of the camera to measure the temperature of the one or more heat sources within the camera. An image sensor, display, lens motor drivers, and main processor are sources of heat. Other sources of heat may be present depending upon specific implementations and features of the camera electronics. Heat generated within the camera is a direct function of the heat sources operating and the duration of operation. Heat effects from each heat source can be empirically determined or calculated. The heat effects are used to determine an appropriate camera time constant. A respective camera time constant can be determined for each combination of operating states of heat generating elements within the camera. Heat transfer properties that cause the lens assembly to warm with respect to an ambient temperature when camera heat sources are turned on and return to the ambient temperature after the heat sources are turned off are used to determine a lens assembly time constant.

Heat effects on the focus mechanism of a lens assembly can be determined over the expected thermal operating range of the lens assembly. The heat effects on the focus mechanism are used to determine a focus error as a function of lens assembly temperature. An error correction generator within the camera generates an error correction signal. The error correction signal is applied to a focus control to ensure that an appropriate number of steps are applied by a focus obtaining system to ensure that the camera adequately focuses subjects-of-interest across the expected thermal operating range of the lens assembly. The error correction signal corresponds to the magnitude of the temperature-induced focus error.

An internal clock and logic within an internal memory or otherwise stored in the camera electronics are used to determine how long the camera has been operating in a heating or a cooling mode. When a heat source is turned on, off, or commanded into a power saving mode, the lens temperature is estimated using a heat transfer model.

One method of modeling the effects of heating and cooling on the lens assembly uses the camera and lens assembly time constants to approximate the rate of temperature change in the lens assembly. The internal clock and related logic provide timestamps for heating and cooling states. During heat inducing states, the time constants are used to determine a temperature that would be reached near the heat generating sources if the camera and environmental (e.g., temperature of the ambient air, foreign heat sources, etc.) conditions remain unchanged. A temperature sensor(s) proximal to the heat sources provides the actual temperature at a location in the body of the camera. During cooling states, the time constants are used to estimate the rate of temperature change in the camera body and the lens assembly.

Turning to the drawings, FIG. 1 is a perspective view illustrating a camera 100. FIG. 1 presents both a rear-facing (i.e., the left most) and front-facing (i.e., the right most) perspective view of camera 100. As illustrated in the rear-facing view, camera 100 includes a body 110. Body 10 provides an enclosure to house camera electronics (not shown) and a support structure for operator-camera interfaces. Operator-camera interfaces include a shutter mechanism 112, view window 114, display 116, and a position control 120 including an up switch, a down switch, a left switch, and a right switch to effect respective up, down, left, and right operations of an indicator presented on display 116.

Shutter mechanism 112 initiates one or more processes during which lens assembly 150, working in concert with camera electronics, focuses a subject-of-interest and exposes the image upon an image sensor or a film within the body 110 to acquire an image of the subject-of-interest. View window 114 enables an operator of camera 100 to observe the subject-of-interest and position the camera 100 as desired to acquire an image.

Display 116 provides information in accordance with various operational modes. For example, in a configuration mode, display 116 may provide various menus and operator selectable options associated with various camera 100 settings, which may include configuration menus and in an image acquisition mode feedback regarding subjects within view of the lens assembly 150. Light source 118 provides a brief source of light over the environment proximal to the front of camera 100 when required as determined by camera electronics or directed by an operator of the camera 100 to adequately expose a subject-of-interest in a dark room or at night.

Lens assembly 150 is coupled to the body 110. Lens assembly 150 can be permanently coupled to the body 10 at the time of manufacture or can be operator replaceable.

Figure 2:
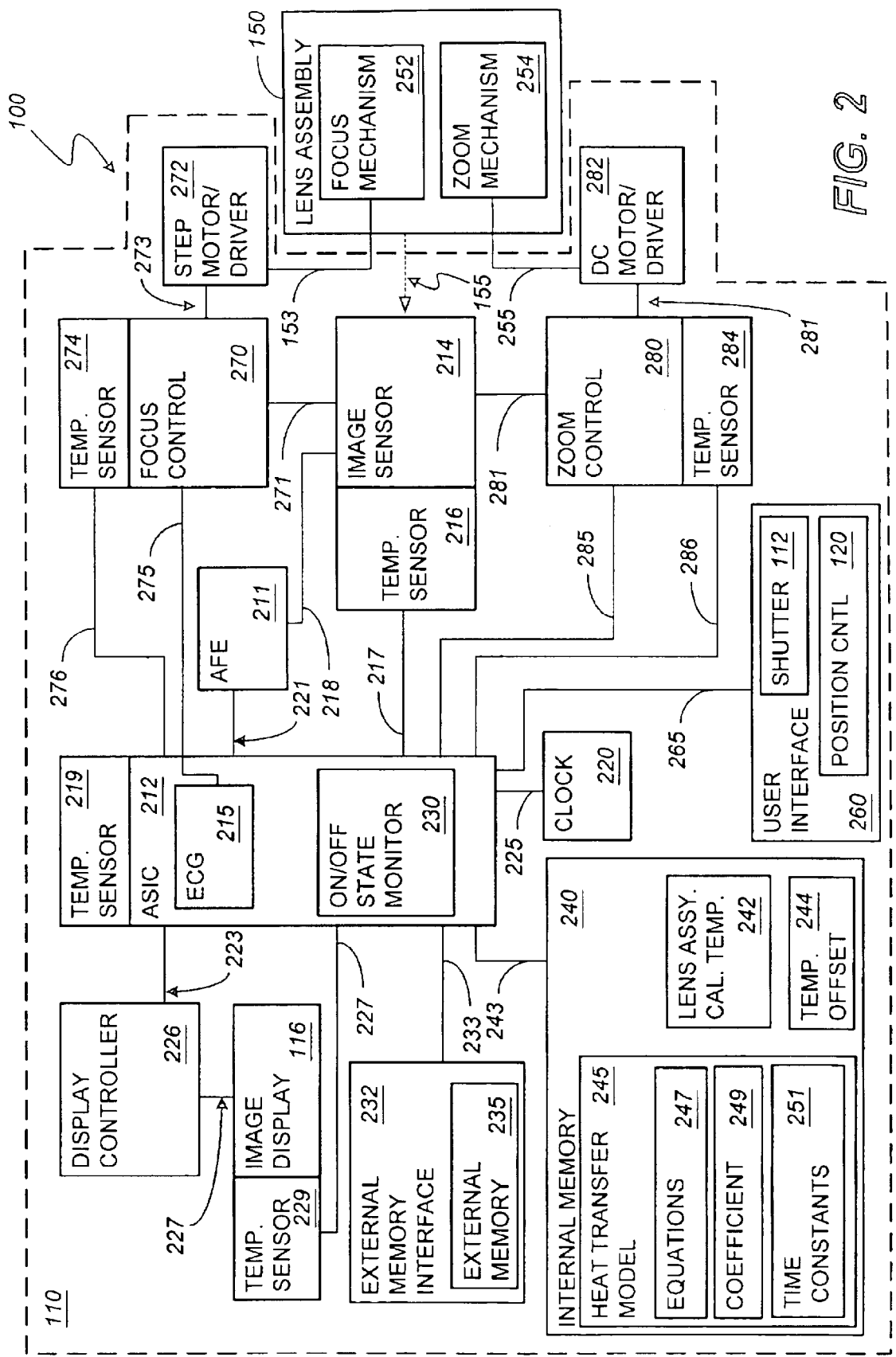
FIG. 2 is a functional block diagram illustrating an embodiment of the camera of FIG. 1.

FIG. 2 is a functional block diagram illustrating an embodiment of the camera 100 of FIG. 1. Camera 100 as previously illustrated in FIG. 1, comprises body 110 and lens assembly 150.

Lens assembly 150 includes focus mechanism 252 and zoom mechanism 254. Zoom mechanism 254 comprises mechanical and optical components that direct light from a subject-of-interest at a range of distances from the camera 100 such that the size of the subject-of-interest can be varied continuously.

As previously described, the mechanical and optical components of lens assembly 150 also vary in operation and relative positioning with changes in temperature. Focus mechanism 252 includes mechanical components that adjust the relative position of optical components within lens assembly 150 to ensure that a subject-of-interest is focused for a particular zoom position and lens assembly temperature.

Body 110 houses camera electronics and lens assembly interfaces to the electronics. As illustrated in FIG. 2, body 110 houses ASIC 212, internal memory 240, analog front end (AFE) 211, image sensor 214, focus control 270, step motor/driver 272, zoom control 280, with direct-coupled (DC) motor/driver 282, clock 220, and external memory interface 232. Image sensor 214 is coupled to AFE 211 via connection 218. ASIC 212 receives image data from AFE 211 via connection 221. ASIC 212 is coupled to clock 220 via connection 225. ASIC 212 communicates with internal memory 240 via connection 243. ASIC 212 is coupled to focus control 270 via connector 275. ASIC 212 is further coupled to zoom control 280 via connector 285. ASIC 212 further provides image information via connector 233 to external memory interface 232.

Image sensor 214 may comprise a charge coupled device (CCD) array or an array of complementary metal-oxide semiconductor (CMOS) sensors. Regardless of whether image sensor 214 comprises an array of individual CCD elements or CMOS sensors, each of the elements in the array comprises a pixel (picture element) of the image sensor 214. The individual pixels of image sensor 214 are typically arranged in a two-dimensional array. For example, an array may comprise 2272 pixels in length and 1712 pixels in height.

Image sensor 214 captures an image of a subject-of-interest by converting light 155 (illustrated by the dashed line in FIG. 2), incident upon image sensor 214, into electrical signals at each pixel. The electrical signals are forwarded via connection 218 to AFE 211. The AFE 211 typically includes an analog-to-digital converter for converting the analog signal received from the image sensor 214 into a digital signal and provides this digital signal containing the image data via connection 221 to ASIC 212 for image processing.

Body 110 further includes operator interfaces, such as image display 116, display controller 226, and user interface 260. ASIC 212 provides image information via connection 223 to display controller 226, which processes and forwards the image information to display 116 via connector 227. ASIC 212 communicates with user interface 260 via connection 265. As shown in FIG. 2, user interface 260 includes shutter mechanism 112 and position control 120. In alternative embodiments (not shown) user interface 260 may include additional pushbuttons, switches, or the like that enable an operator of the camera 100 to input various commands.

ASIC 212 also sends display data via connection 223 to display controller 226. The display controller 226 can be, for example, a national television system committee (NTSC)/phase alternate line (PAL) encoder, although, depending on the application, other standards for displaying display data may be used. The display controller 226 converts the display data from ASIC 212 into a signal that can be forwarded to the image display 116 via connection 227. Image display 116, which can be, for example, a liquid crystal display (LCD) or other display, displays the captured image to an operator of the camera 100. In alternative modes, image display 116 is provided camera configuration information, configuration menus, and other information.

ASIC 212 also communicates via connection 233 to external memory interface 232. External memory interface can store and retrieve image information on an external memory device 235. External memory device 235 provides a mechanism for transferring digital representations of captured images from camera 100. Alternative embodiments of camera 100 (not shown) may include one or more ports suitable for direct connections to cables and docketing stations communicatively coupled to an image data processing device.

Body 110 further includes a plurality of temperature sensors 216, 219, 229, 274, 284 each proximally located to a heat generating element. For example, temperature sensor 216 is closely located to image sensor 214, temperature sensor 219 is closely located to ASIC 212, and temperature sensor 229 is closely located to image display 116. Temperature sensor 274 is closely located to focus subsystem components within body 110. Temperature sensor 284 is closely located to zoom subsystem components within body 110. In an alternative embodiment, a single temperature sensor disposed within body 110 can be used to determine an internal camera 100 temperature. Regardless of the particular embodiment, each of the temperatures sensors 216, 219, 229, 274, and 284 may be a diode, a transistor, a thermistor, or other device having one or more electrical properties that vary as a function of their temperature. Accordingly, each of the temperature sensors 216, 219, 229, 274, 284 provides a signal that can be converted within ASIC 212 to a representation of a local temperature within body 110.

Focus subsystem components within the body 110 include focus control 270 and step motor/driver 272. Zoom subsystem components within the body 110 include zoom control 280 and DC motor/driver 282. Focus subsystem components receive image information responsive to incident light upon image sensor 214. As illustrated in the embodiment of FIG. 2, focus control 270 is coupled to image sensor 214 via connection 271. Focus control 270 provides a control signal via connection 273 to step motor/driver 272, which is mechanically coupled via linkage 153 to focus mechanism 252.

Similarly, zoom subsystem components receive image information responsive to incident light upon image sensor 214. Zoom control 280 is coupled to image sensor 214 via connection 281. Zoom control provides a control signal via connection 283 to DC motor/driver 282, which is mechanically coupled via linkage 255 to zoom mechanism 254.

ASIC 212 controls and coordinates various functions of camera 100. In addition to receiving image information from AFE 211, providing image information and menu information via display controller 226 and image display 116, storing image information via external memory interface 232, receiving operator inputs via user interface 260, and coordinating the activities of the focus and zoom subsystems, ASIC 212 processes or otherwise executes executable instructions provided in firmware (not shown) within ASIC 212 or within software provided in internal memory 240.

As illustrated in FIG. 2, internal memory 240 comprises heat transfer model 245, lens assembly calibration temperature 242, and temperature offset 244. Heat transfer model 245 provides a mathematical simulation of the heating effects of the heat generating elements within body 110 on the lens assembly 150. For example, when the lens assembly 150 absorbs heat generated by electronic components within the body 110, such as ASIC 212, image sensor 214, image display 116, or other heat-generating sources in the camera 100, the relative position of components within lens assembly 150 changes in proportion to the temperature change in the lens assembly 150. The amount of heat generated in the camera 100 is related to the number of heat-generating sources and the duration of time that these heat sources are operating. The operational state of each of the heat-generating sources is monitored by ASIC 212, which also monitors the amount of time (using the clock 220) that the heat-sources are operating, or the amount of time since the heat sources entered a power saving mode or were shut off.

Heat transfer model 245 further comprises equations 247, a coefficient 249, and time constants 251. The lens assembly calibration temperature 242 is a temperature recorded at the time the combination of the focus subsystem components within the body 110, linkage 153, and focus mechanism 252 were calibrated during manufacture of camera 100. Temperature offset 244 is a difference between ambient temperature and a temperature that the lens assembly 150 will approach if the present on/off state of the heat generating elements remains constant for a sufficient length of time.

As described in further detail below, ASIC 212 using information from clock 220, an on/off state monitor 230, the heat transfer model 245, one or more sensed temperatures, the lens assembly calibration temperature 242, and temperature offset 244 estimates a lens assembly temperature. Clock 220 keeps accurate track of time. ASIC 212 associates an accurate time stamp with each state change of heat generating elements (e.g., the image sensor 214, the ASIC 212, focus and zoom subsystem elements within body 110, and image display 116). On/off or power saving mode operational state changes are recorded by on/off state monitor 230. On/off state monitor 230 records a state identifier and an element identifier. ASIC 212 selects an appropriate time constant as stored in internal memory 240 for the combination of heat generating elements and their respective operating states. ASIC 212 applies the appropriate time constant to the equations 247 to estimate a current temperature of the lens assembly 150.

Heat transfer model 245 for simulating the heating and cooling of the lens assembly 150 uses first-order time constants to approximate the rate of change of the lens assembly temperature. A separate camera time constant is determined for each combination of heat generating sources and operating states of heat sources within the camera 100. During heating, a time constant is used to determine the final temperature that would be reached in the vicinity of the heat sources if the digital camera 100 and the environment surrounding the camera 100 remained unchanged. A temperature sensor (e.g., temperature sensor 216) or a combination of temperature sensors provides information regarding actual temperature within body 110. Clock 220 and on/off state monitor 230 provide information regarding operational states of heat generating elements and the duration since the last change.

The following variables and constants are used across the equations 247 forming a portion of heat transfer model 245. $S_{OFF}$ is a recorded temperature within the body 110 at a time when the camera 100 is turned off or enters a power saving mode. SON is a recorded temperature within the body 110 at a time when the camera 100 is turned on or enters a power consuming mode. $S_{SHUTTER}$ is a recorded temperature within the body 110 at a time when shutter 112 is activated by an operator of the camera 100. $L_{OFF}$ is an estimated temperature of lens assembly 150 at a time when the camera 100 is turned off or enters a power saving mode. $L_{ON}$ is an estimated temperature of lens assembly 150 at a time when the camera 100 is turned on or enters a power consuming mode. $T_{OFFSET}$ is a constant representing the difference between ambient temperature and the temperature within body 110 when the camera 100 is fully warmed up. HPC is a constant representing the difference between ambient temperature and the lens assembly temperature when the camera is fully warmed up divided by $T_{OFFSET}$. FC is a constant representing the amount of focus subsystem movement (i.e., steps) required to compensate for a one degree change in lens assembly temperature from the temperature of the lens assembly when the focus subsystem was calibrated. LTC is a lens assembly time constant. The LTC can be empirically determined by measuring the temperature of a representative lens assembly or the lens assembly of interest over time while holding the ambient temperature constant. The LTC can be calculated by other heat transfer models or simulations. CTC is a camera time constant. The CTC can be empirically determined by measuring the temperature of the camera body 110 over time while maintaining a known operating state of the heat generating elements within body 10 and holding the ambient temperature constant. A CTC for each combination of operating states of heat generating elements can be calculated for the camera body 110 using other heat transfer models or simulations.

In accordance with one embodiment of the heat transfer model 245, each time camera 100 is turned off, ASIC 212 stores a first time, $T_1$, and records the internal temperature of the camera 100, $S_{OFF}$. Thereafter, when an operator of the camera 100 turns the camera on, ASIC 212 stores a second time, $T_2$, and records the internal temperature of the camera 100, $S_{START}$. When more than one temperature sensor is available within body 110, $S_{OFF}$ and $S_{START}$ may be a mathematical combination of a plurality of temperature sensors (e.g., an average, a weighted average, etc.). Ambient temperature ($T_{AMBIENT}$) at time, $T_2$ is estimated using the following:

$$T_{AMBIENT}=(S_{START}-S_{OFF})\div(1-e^{(-(T_2-T_1)\div CTC)})+S_{OFF} \qquad \text{Eq. 1}$$

Lens temperature, $L_{START}$ is estimated using:

$$L_{START}=(T_{AMBIENT}-L_{OFF})\times(1e^{(-(T_2-T_1)\div LTC)})+L_{OFF} \qquad \text{Eq. 2}$$

At time, $T_3$, an operator presses shutter 112. Camera 100 responds by calculating the temperature, $S_{TFINAL}$, that the internal temperature sensor(s) would reach if camera 100 was allowed to operate in the present state indefinitely. The internal temperature sensor(s) at $T_3$ is recorded as $S_{SHUTTER}$. In accordance with heat transfer model 245, $S_{TFINAL}$ is calculated as follows:

$$S_{TFINAL}=(S_{SHUTTER}-S_{START})\div(1-e^{(-(t_3-T_2)\div CTC)})+S_{START} \qquad \text{Eq. 3}$$

Ambient temperature, $T_{AMBIENT2}$ is then estimated using the following:

$$T_{AMBIENT2}=S_{TFINAL}-T_{OFFSET} \qquad \text{Eq. 4}$$

The lens temperature heats toward a future lens temperature, $L_{FUTURE}$, which is calculated as follows:

$$L_{FUTURE}=T_{AMBIENT2}+(S_{SHUTTER}-T_{AMBIENT2})\times HPC \qquad \text{Eq. 5}$$

The lens temperature at time $T_3$ is then estimated using the following:

$$L_{EST}=(L_{FUTURE}-L_{START}) \times (1e^{(-(T_3-T_2)+LTC)})+L_{START} \quad \text{Eq. 6}$$

The estimated lens temperature at time $T_3$ is then used to determine the number of focus steps to be applied to focus control 270 to account for temperature induced focus error in lens assembly 150 as follows:

$$\text{STEPS}=FC \times (L_{EST}-L_{CAL}) \quad \text{Eq. 7}$$

In the embodiment illustrated in FIG. 2, ASIC 212 provides the estimated lens assembly temperature to an error correction generator (ECG) 215 which provides an error correction signal, in accordance with the number of steps provided by Equation 7, to focus control 270 to correct temperature-induced focus error within lens assembly 150. The error correction signal reduces the number of steps through which components of lens assembly 150 move during a focus operation, thus reducing focus time and allowing the lens assembly 150 to be adequately positioned to provide an accurate focus for subjects-of-interest at various distances from camera 100.

Systems for estimating a lens assembly temperature are not limited by the specific arrangement of elements illustrated in the functional block diagram of FIG. 2. For example, while camera 100 is shown with a single ASIC 212, camera 100 may include additional processors, digital signal processors (DSPs) and ASICs. In addition, ASIC 212 may also include other elements, which are omitted for simplicity of illustration and description. Furthermore, camera 100 may employ various types of memory not specifically described herein. For example, camera 100 may comprise volatile, and/or non-volatile memory elements, such as, for example but not limited to, random access memory (RAM), read-only memory (ROM), and flash memory. Moreover, the memory elements may be either internal to the camera 100 or may be removable memory media, and may also comprise memory distributed over various elements within the camera 100. All such memory types are contemplated and within the scope of the systems for estimating lens temperature.

Any process descriptions or blocks in the flow diagrams illustrated in FIGS. 3–7 should be understood as representing logical functions or steps in an associated process. Alternative implementations are included within the scope of the present methods for estimating temperature of a lens assembly. For example, functions may be executed out of order from that shown or discussed, including substantially concurrently or in reverse order, depending on the functionality involved.

Figure 3:
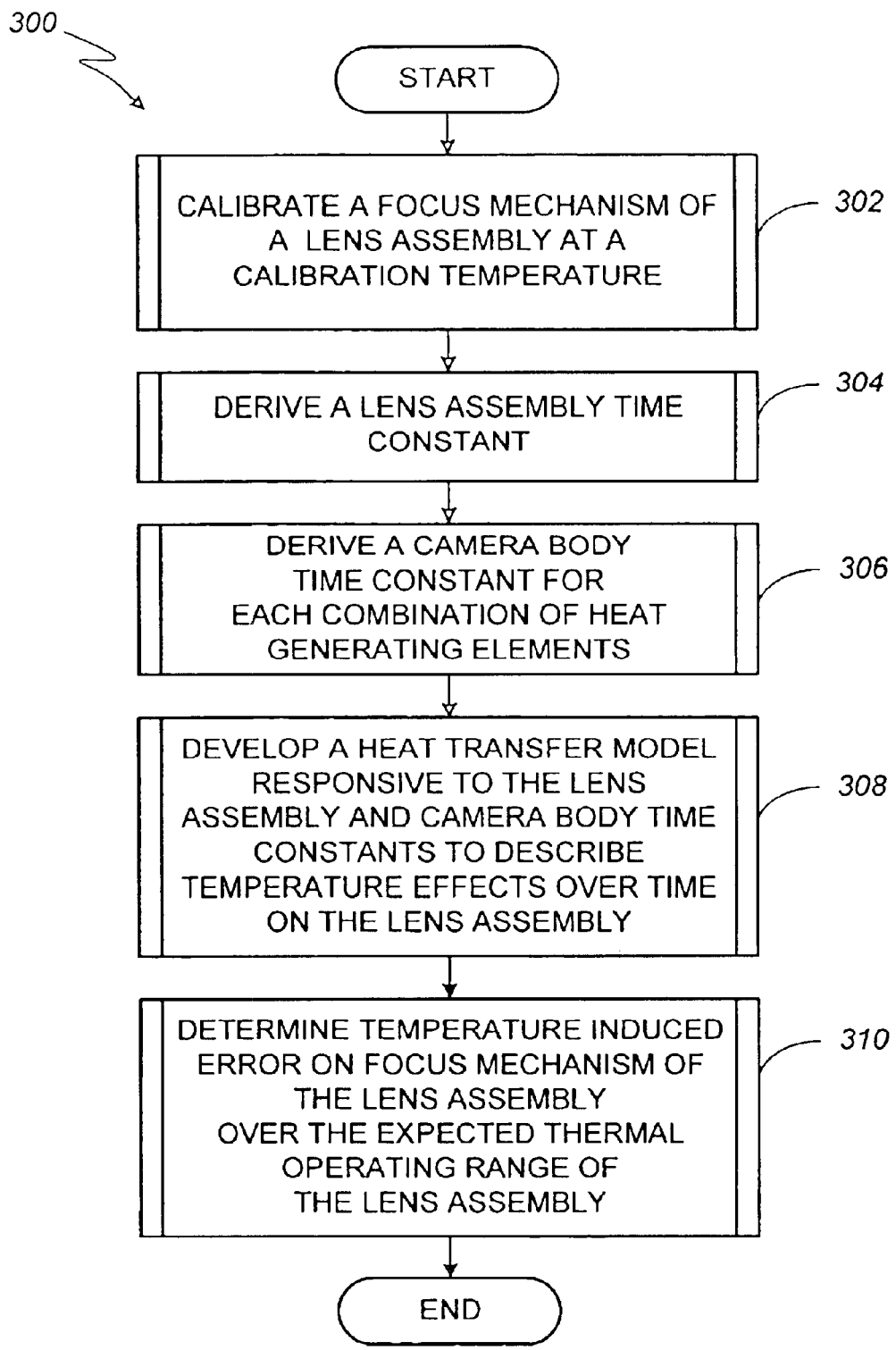
FIG. 3 is a flow diagram illustrating an embodiment of a method for modeling the heat transfer effects over time on the lens assembly of the camera of FIG. 1 and FIG. 2.

FIG. 3 is a flow diagram illustrating an embodiment of a method 300 for modeling the heat transfer effects over time on the lens assembly of the camera of FIG. 1 and FIG. 2. Method 300 begins with block 302 where as illustrated a focus mechanism of a lens assembly 150 is calibrated at a calibration temperature. In block 304 a lens assembly temperature offset is derived. This can be accomplished by varying the temperature of the lens assembly and determining the corresponding effect on lens components responsible for focusing incident light upon an image sensor located in the body 110 of camera 100. In block 306 a camera body time constant is derived for each combination of heat generating elements within the body 110 of the camera 100. Thereafter, as indicated in block 308, a heat transfer model responsive to the lens assembly and the camera body time constants is developed to describe temperature effects over time on the lens assembly. In block 310 a temperature-induced error on the focus mechanism of the lens assembly is determined over the expected thermal operating range of the lens assembly.

The heat transfer model developed in block 308 can be used to estimate the temperature of the lens assembly 150 as a function of the on/off state of the heat generating elements within the body 110 of camera 100 and the duration since the last on/off (or power saving mode) state change. Once the temperature of the lens assembly is determined, the temperature-induced error on the focus mechanism at that temperature can be corrected by appropriately adjusting the location within the range and the number of focus adjustment steps applied to the focus mechanism.

Figure 4:
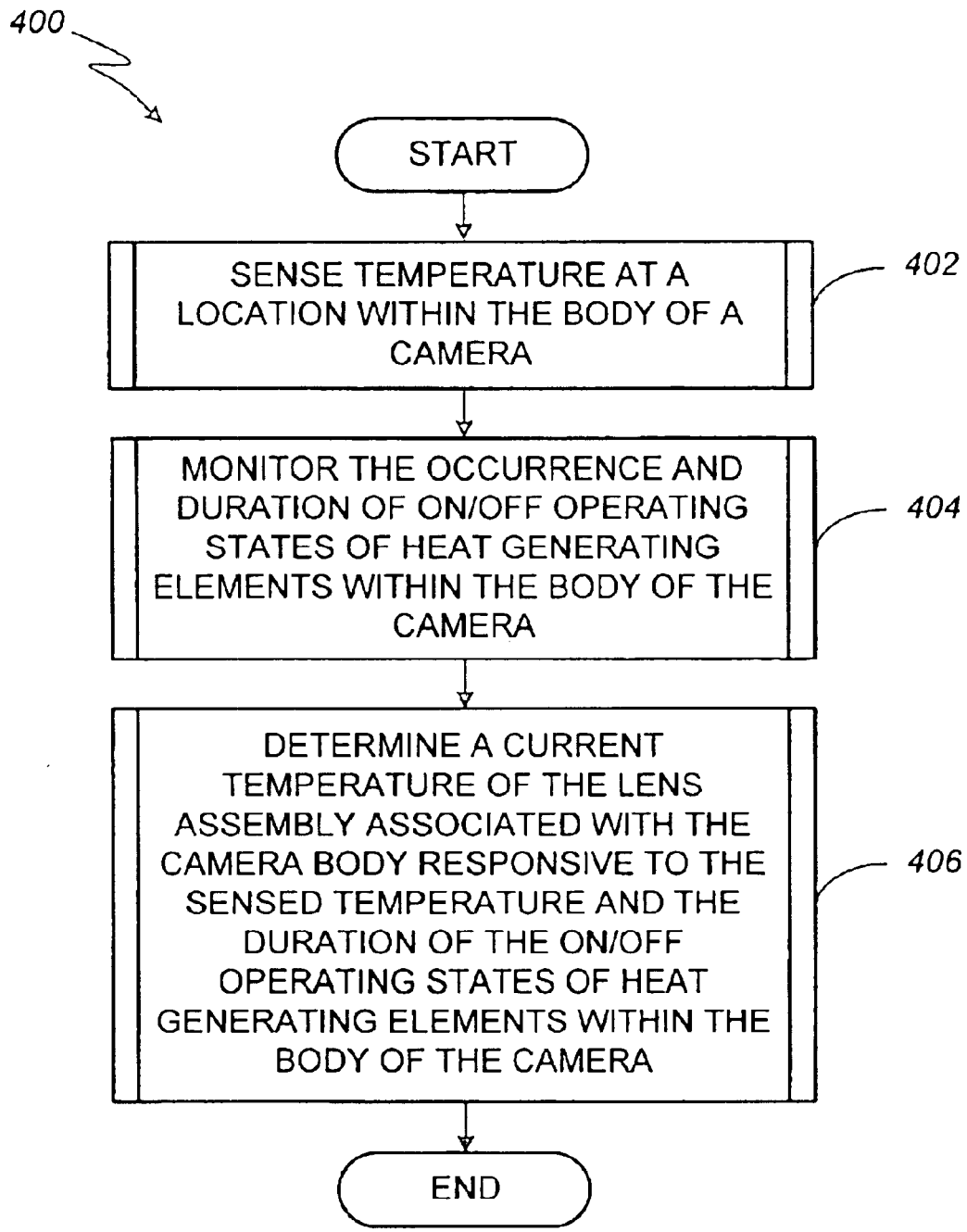
FIG. 4 is a flow diagram illustrating an embodiment of a method for determining a current temperature of a lens assembly coupled to the camera of FIG. 1 and FIG. 2

FIG. 4 is a flow diagram illustrating an embodiment of a method 400 for determining a current temperature of a lens assembly coupled to the camera of FIG. 1 and FIG. 2. Method 400 begins with block 402 where temperature is sensed at a location within the body 110 of camera 100. In block 404, camera 100 monitors the occurrence and duration of on/off operating state changes of heat generating elements within the body 110 of the camera 100. In block 406, camera 100 determines a current temperature of the lens assembly 100 coupled with the camera body 110 responsive to the sensed temperature and the duration of the on/off operating states of heat generating elements within the body 110 of the camera 100.

Figure 5:
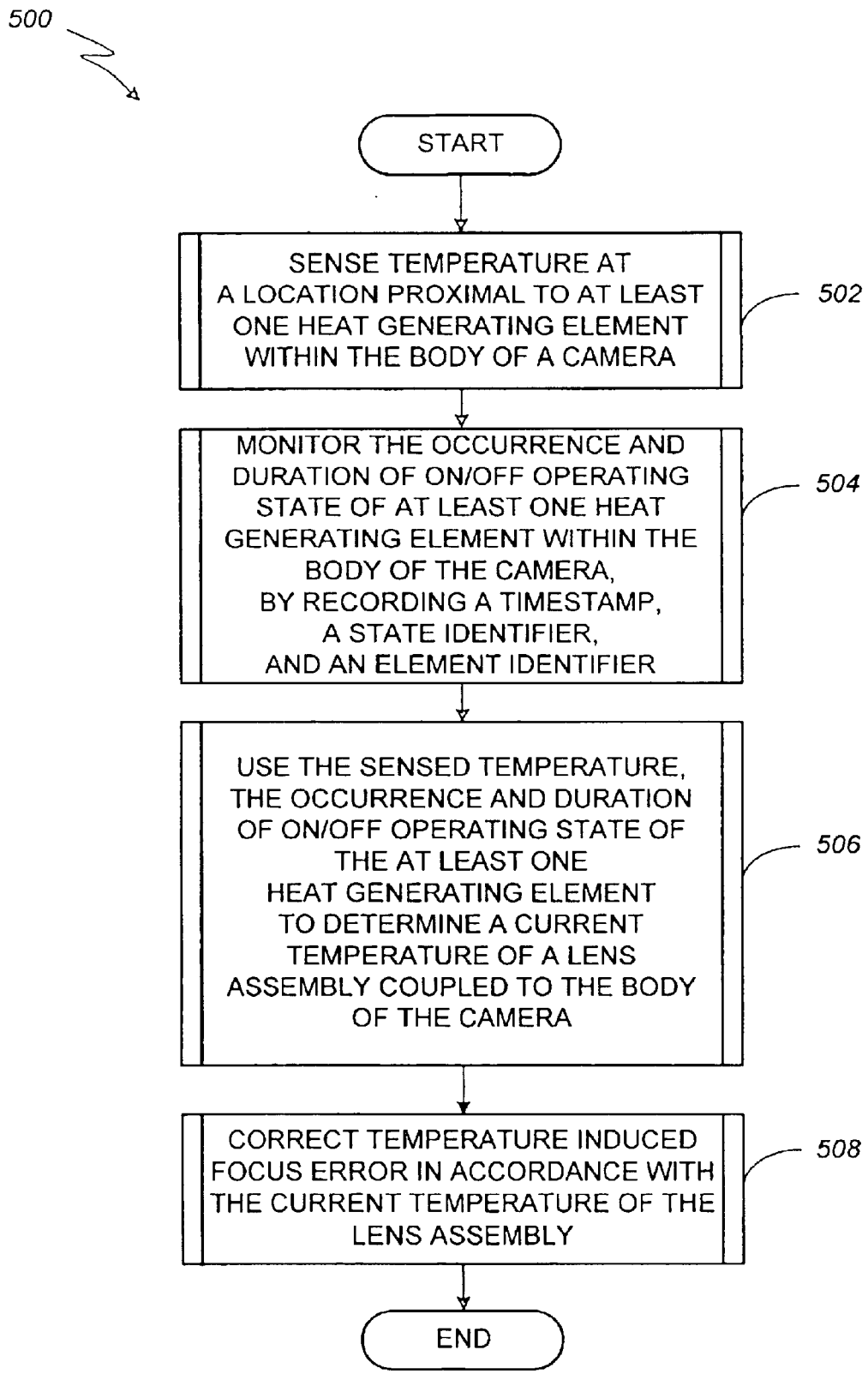
FIG. 5 is a flow diagram illustrating an embodiment of a method for correcting temperature induced focus error in accordance with a current temperature of the lens assembly.

FIG. 5 is a flow diagram illustrating an embodiment of a method 500 for correcting temperature induced focus error in accordance with a current temperature of the lens assembly. Method 500 begins with block 502 where camera 100 senses temperature at a location proximal to at least one heat generating element within the body 110 of camera 100. In block 504, camera 100 monitors the occurrence and duration of on/off operating state of at least one heat generating element within the body 110 of camera 100. This can be accomplished by recording a timestamp responsive to clock 220 (FIG. 2), a state identifier responsive to the present operating state (ie., on/off or in a power save mode) of the at least one heat generating element, and an element identifier.

In block 506, camera 100 uses the sensed temperature, the occurrence and duration of on/off operating states of the at least one heat generating element within the body 110 of camera 100 to determine a current temperature of a lens assembly 150 coupled to the body 110 of the camera 100. Thereafter, as indicated in block 508, camera 100 corrects temperature-induced focus error in accordance with the current temperature of the lens assembly 150.

Figure 6:
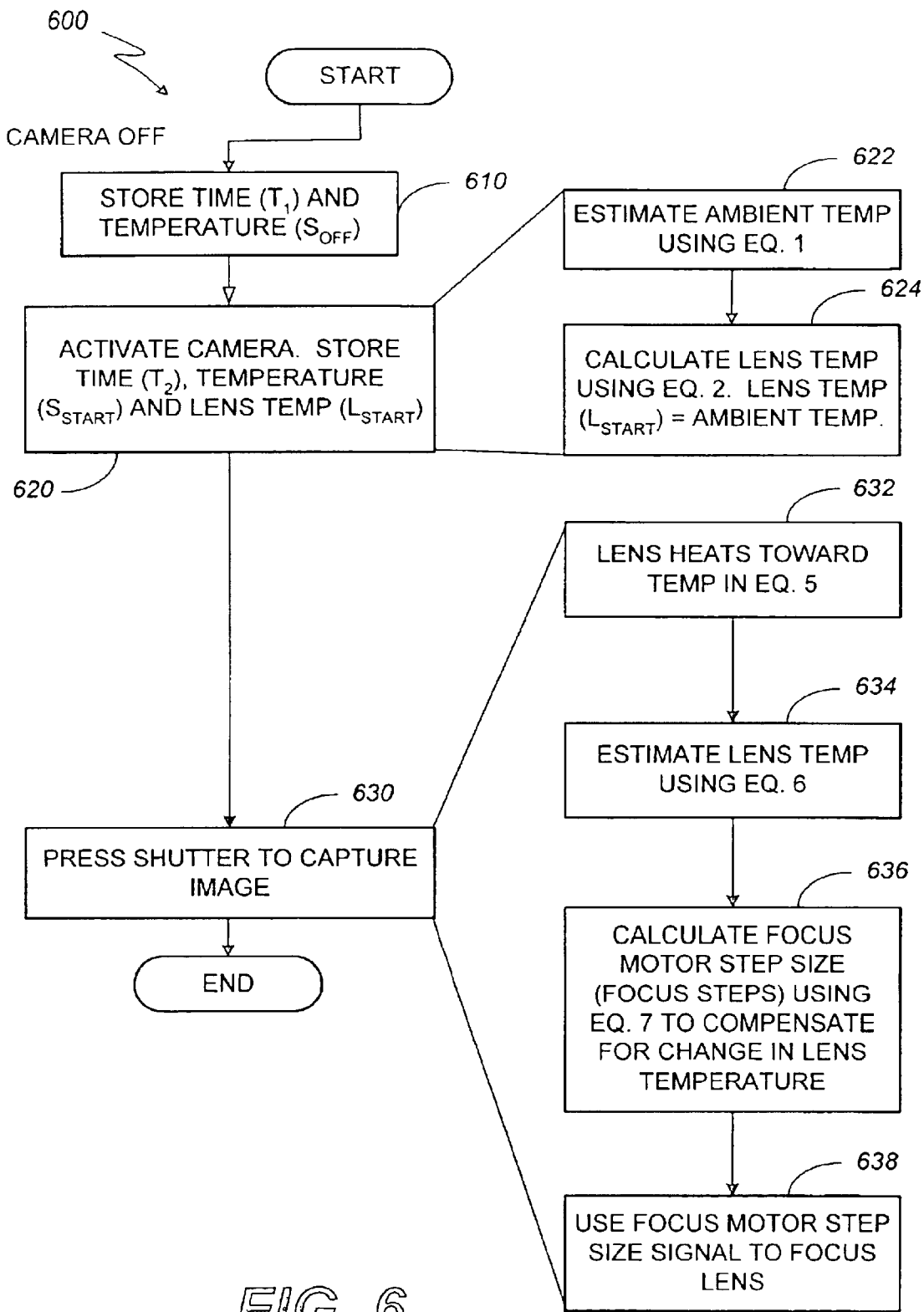
FIG. 6 is a flow diagram illustrating an embodiment of a method for determining an appropriate focus range to apply to the focus mechanism when a heat generating element is heating the lens assembly.

FIG. 6 is a flow diagram illustrating an embodiment of a method 600 for determining an appropriate focus range to apply to the focus mechanism when a heat generating element is heating the lens assembly. Turning to FIG. 6, method 600 begins immediately after the camera 100 is set to the off position (or enters a power saving mode) and assumes that the camera 100 has been off for a period of time sufficient to allow the heal-generating element(s) to cool. In block 610, the current time, $T_1$, is obtained from the internal clock 220 (FIG. 2) and the current sensor temperature, $S_{OFF}$, is obtained from one or more of the temperature sensors 216, 219, 229, 274, 284 (FIG. 2).

When more than one of the heat generating elements are activated, a temperature is recorded from the corresponding temperature sensor. These temperature values are stored in internal memory 240 and are used to determine $S_{OFF}$ for camera 100. In some embodiments, $S_{OFF}$ is the temperature as recorded by sensor 216 in close proximity to image sensor 214. In other embodiments, $S_{OFF}$ is a weighted average of various combinations of sensed temperatures associated with the heat generating elements of camera 100.

In block 620, camera 100 is activated. When camera 100 is activated, the current time, $T_2$, is obtained from the internal clock 220 (FIG. 2) and the temperature $S_{START}$ is obtained as a function of one or more of the temperature sensors 216, 219, 229, 274, 284 at the time $T_2$. The time $T_2$ and the temperature $S_{START}$ are stored in the internal memory 240 (FIG. 2).

In block 622, the ambient temperature is estimated using Equation 1. In block 624, the lens temperature $L_{START}$ is calculated using Equation 2. When camera 100 is deactivated or off for a relatively long period of time, the time difference $T_2-T_1$ is large and Equation 2 simplifies to yield a lens temperature, $L_{START}$, equal to the ambient temperature. Therefore, in this example, the lens temperature $L_{START}$ is equal to the ambient temperature.

In block 630, an operator of the camera 100 partially presses the shutter to activate the focus control 270, step motor/driver 272, focus mechanism 252, and image sensor 214 to perform a lens assembly focus operation. At this time, it is assumed that heat-generating elements in camera 100 are operating and generating heat. In block 632, the lens slowly heats towards the future lens temperature in accordance with Equation 5. Equation 5 uses the ambient temperature determined in block 622. In block 634, the estimated lens temperature is calculated using Equation 6. The estimated lens temperature is used to determine the degree to which the relationship among the components within lens assembly 150 changes and alters a focus operation of the lens assembly 150.

In block 636, Equation 7 is used to calculate a correction factor representing the degree to which the focus control 270 should direct step motor/driver 272 to adjust the focus mechanism 252 of lens assembly 150 (FIG. 2) to compensate for the difference between the estimated temperature determined in block 634 and a calibration temperature (ie., the temperature of the lens assembly 150 when the focus control 270 was calibrated during manufacturing). This correction factor is supplied as a correction signal from the error correction generator (ECG) 215 in ASIC 212 to the focus control 270 (FIG. 2). In block 638, the step motor/driver 272 as directed by focus control 270 converts the correction signal into mechanical movement when manipulating focus mechanism 252.

Figure 7:
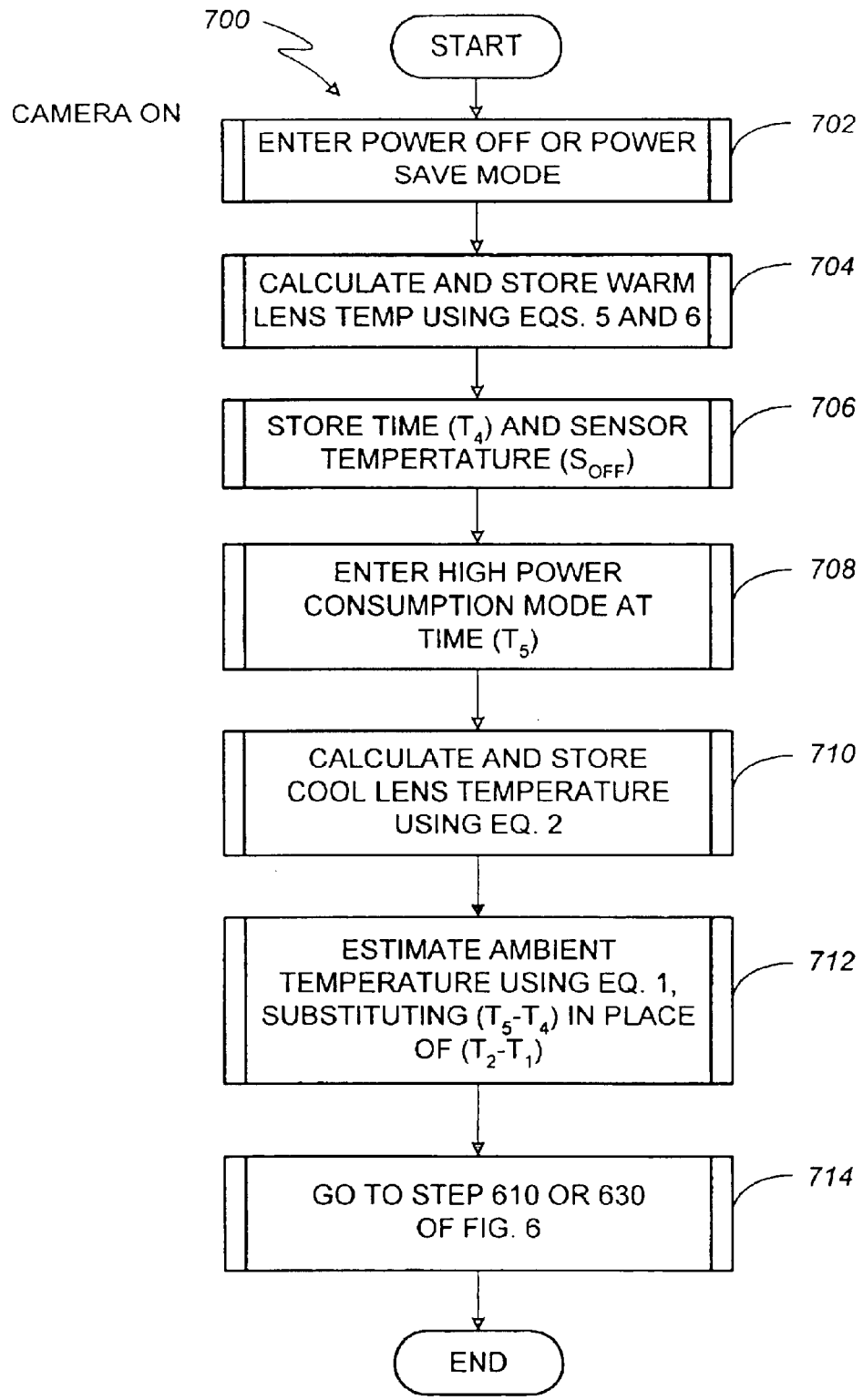
FIG. 7 is a flow diagram illustrating an embodiment of a method for determining an appropriate focus range to apply to the focus mechanism when the camera is used to acquire an image after a power off or power saving mode.

FIG. 7 is a flow diagram illustrating an embodiment of a method 700 for determining an appropriate focus range to apply to the focus mechanism when the camera is used to acquire an image after a power off or power saving mode. In FIG. 7, it is assumed that the camera 100 has recently been deactivated after being on and operating and that the camera 100 is beginning to cool. In block 702, the camera 100 is switched off or otherwise enters a power saving mode. In block 704, the current (warm) lens temperature is calculated using Equations 5 and 6. The current lens temperature is stored in internal memory 240 (FIG. 2).

Next, in block 706, the current time, $T_4$, and the sensor temperature, $S_{OFF}$, are obtained from internal clock 220 and the temperature sensors 216, 219, 229, 274, 284, respectively. The current time and sensor temperature are also stored in internal memory 240.

In block 708, camera 100 is switched on, or otherwise enters a high power consumption mode at time, $T_5$. In block 710, the current (cool) lens temperature is calculated using Equation 2. The current lens temperature is stored in internal memory 240 along with the other times and temperatures. In block 712, the ambient temperature is estimated using Equation 1, substituting the difference between times $T_5$ and $T_4$ in place of the difference between times $T_2$ and $T_1$ in Equation 1. Next, in block 714, the process returns to either block 610 or 630 in the flow diagram of FIG. 6 in accordance with input from an operator of the camera 100.

Figure 8A:
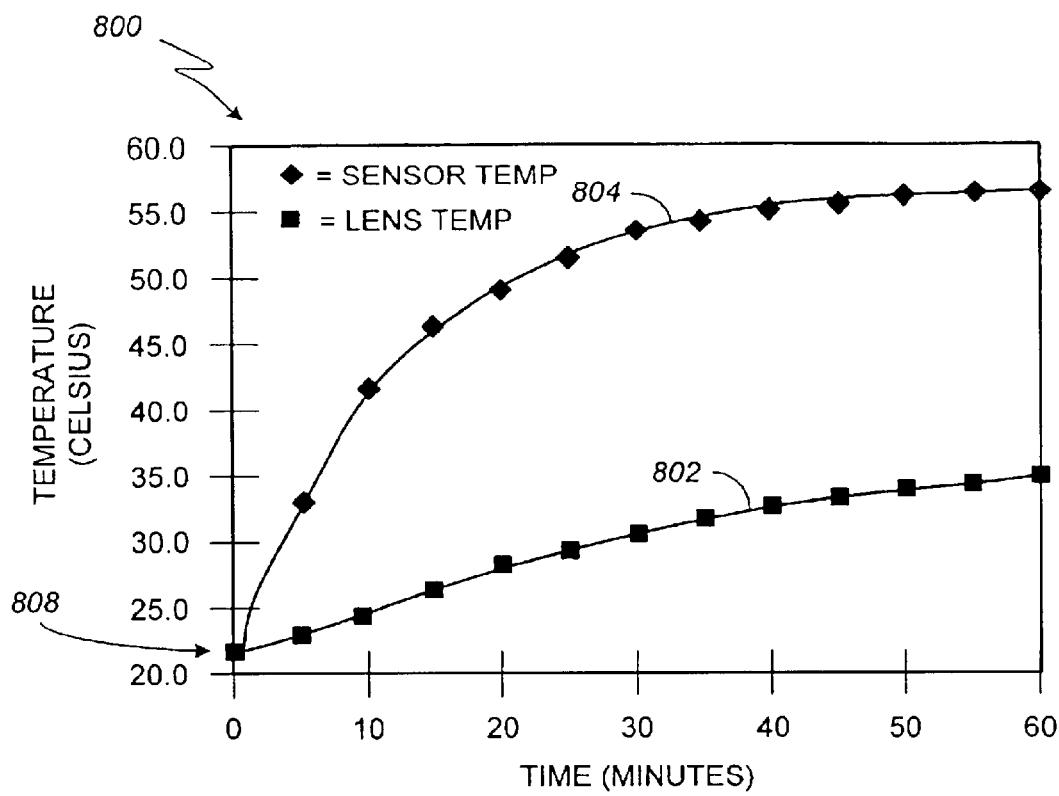
FIGS. 8A and 8B are plots illustrating sample empirical results of temperature as sensed within the body of a camera and estimated for a lens assembly coupled to the camera body vs. time.
Figure 8B:
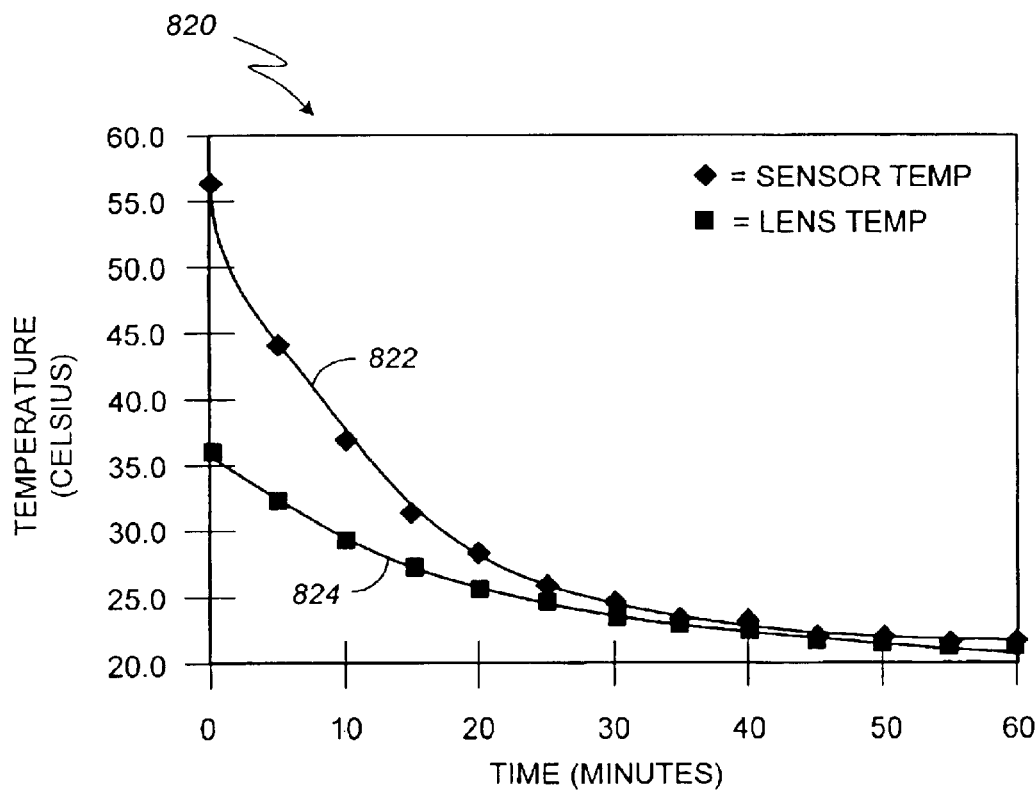

FIGS. 8A and 8B are plots illustrating sample empirical results of temperature as sensed within the body 110 of a camera 100 (FIGS. 1 and 2) and estimated for a lens assembly 150 coupled to the camera body 110 vs. time. In FIG. 8A, plot 800 shows a measured temperature from within the body 110 of camera 100 and an estimated temperature of the lens assembly 150 over a 60-minute period after a heat generating element has been activated. In FIG. 8A, plot 800 presents elapsed time from a state change (i.e., a heat generating element tuned "on") shown along the horizontal axis increasing to the right and temperature in Celsius on the vertical axis increasing upward from the horizontal axis. As shown, the temperature of the lens, depicted using curve 802, starts at ambient temperature 808 and settles between the sensor temperature, illustrated using curve 804 and ambient temperature. As shown in plot 800, temperature effects on the lens assembly 150 are nearly constant over the entire 60 minutes after a heat generating element within the body 110 of the camera 100 is activated. Plot 802 illustrates that the temperature of lens assembly 150 increases approximately 12 degrees Celsius over the first 60 minutes.

In FIG. 8B, plot 820 presents elapsed time from a state change (i.e., a heat generating element turned "off") along the horizontal axis with time increasing to the right and temperature in Celsius along the vertical axis increasing upward from the vertical axis for an example camera 100. In plot 820, at time $T_0$ (i.e., time=0 minutes) the sensor temperature, represented by curve 822 is much warmer than the lens temperature represented by curve 824. However, as time increases, the sensor temperature 822 and the lens temperature 824 tend to equalize as both approach ambient temperature. As shown in plot 820, temperature effects on the lens assembly 150 are greater in magnitude over the first 30 minutes after a heat generating element within the body 110 of the camera 100 is deactivated. Plot 820 illustrates that the temperature of lens assembly 150 falls approximately 12 degrees Celsius over the first 30 minutes.

While various embodiments of the camera and methods for estimating lens temperature have been described, it will be apparent to those of ordinary skill in the art that many more embodiments and implementations are possible within the scope of the camera and the related methods for estimating temperature of a lens assembly. All such modifications and variations are intended to be included herein and are protected by the following claims.

What is claimed is:

1. A method for estimating the temperature of a camera lens, comprising:

sensing temperature at a location within the body of a camera;

monitoring the occurrence and duration of on/off operating states of heat generating elements of the camera; and using the temperature at a location within the body of the camera and monitored occurrence and duration of on/off operating states of heat generating elements within the camera body to determine a current temperature of a lens assembly coupled to the camera.

2. The method of claim 1, further comprising:

correcting temperature induced focus error in accordance with the current temperature of the lens assembly.

3. The method of claim 1, wherein using the temperature at a location within the body of the camera and monitored occurrence and duration of on/off operating states to determine a current temperature of a lens assembly comprises using a model to estimate temperature of the lens assembly as a function of time.

4. The method of claim 3, wherein using a model to estimate temperature comprises determining a time constant for each combination of heat generating elements.

5. The method of claim 3, wherein the model is a mathematical model of heat transfer effects from the body of the camera to the lens assembly.

6. The method of claim 3, wherein the model is generated responsive to empirical data.

7. The method of claim 3, wherein the model is generated responsive to calculation.

8. The method of claim 1, wherein using the temperature at a location within the body of the camera and monitored occurrence and duration of on/off operating states to determine a current temperature of a lens assembly comprises associating the occurrence of operating state changes with time stamps.

9. The method of claim 1, wherein correcting temperature induced focus error comprises determining the number of focus position steps to reposition a focus mechanism.

10. The method of claim 9, wherein determining the number of focus position steps comprises determining a difference between the current temperature of a lens assembly and a temperature of the lens assembly when the focus mechanism of the camera was calibrated.

11. A system, comprising:
means for measuring at least one temperature within the body of a camera;
means for determining the occurrence of on/off state changes of heat generating elements within the camera;
means for determining an elapsed time since a last on/off state change;
means for estimating the temperature of a lens assembly coupled to the camera responsive to the on/off state of heat generating elements within the camera and an elapsed time since a last on/off state change;
means for correcting temperature induced focus error in accordance with the estimated temperature of the lens assembly.

12. The system of claim 11, wherein said means for estimating the temperature of a lens assembly coupled to the camera comprises a means for calculating an ambient temperature.

13. The system of claim 11, wherein said means for estimating the temperature of a lens assembly coupled to the camera comprises applying a time constant to a model.

14. The system of claim 11, wherein said means for adjusting temperature induced focus error comprises determining the number of focus position steps to traverse when adjusting a focus mechanism.

15. The system of claim 14, wherein determining the number of focus position steps to traverse when adjusting a focus mechanism is responsive to a temperature offset from a lens assembly temperature when the focus mechanism was calibrated.

16. A camera, comprising:
a heat generating element within a body of said camera;
a sensor proximally located to said heat generating element, said sensor configured to provide a signal responsive to temperature;
a lens assembly coupled to said camera, said lens assembly including a focus mechanism; and
a processor configured to apply an input responsive to said signal to a heat transfer model to determine a temperature of said lens assembly, wherein said processor is further configured to determine a focus error correction responsive to the temperature of said lens assembly.

17. The camera of claim 16, further comprising:
a state sensor configured to identify an on/off state responsive to said heat generating element; and
a clock configured to associate a timestamp responsive to changes in the on/off state of said heat generating element, wherein the heat transfer model is responsive to the duration since a last occurrence of a change in the on/off state of said heat generating element.

18. The camera of claim 16, wherein the heat transfer model comprises a time constant responsive to said heat generating element.

19. The camera of claim 16, wherein the heat transfer model is responsive to empirical temperature data.

20. The camera of claim 16, wherein the focus error correction is responsive to a temperature of said lens assembly when said focus mechanism was calibrated.

21. The camera of claim 16, wherein the focus error correction directs a focus range applied during an auto-focus process.

22. A computer-readable medium having a program for correcting temperature induced focus error in a camera, the program comprising logic for:
recording a first time and a first input responsive to a heat generating element within the body of the camera responsive to said camera being turned off;
recording a second time and a second input responsive to the heat generating element responsive to said camera being turned on;
estimating a first lens assembly temperature responsive to an ambient temperature and a lens assembly temperature when said camera was turned off;
recording a third time responsive to a shutter input;
estimating a present lens assembly temperature responsive to the shutter input; and
determining a focus range appropriate to apply to the lens assembly to compensate for delta between the present lens assembly temperature and a temperature of the lens assembly when the focus mechanism was calibrated.

23. The computer-readable medium of claim 22, wherein estimating a present lens assembly temperature is responsive to a constant representing the difference between ambient temperature and a steady-state lens assembly temperature.

24. The computer-readable medium of claim 22, wherein estimating a present lens assembly temperature is responsive to a constant representing the difference between ambient temperature and a steady-state input responsive to the heat generating element when the heat generating element is turned on.

25. The computer-readable medium of claim 22, wherein estimating a present lens assembly temperature is responsive to a difference determined from the third time and the second time.

26. The computer-readable medium of claim 22, wherein estimating a present lens assembly temperature is responsive to a lens assembly time constant.

27. The computer-readable medium of claim 26, wherein the lens assembly time constant is derived from empirical data.

28. The computer-readable medium of claim 26, wherein the lens assembly time constant is calculated.

29. The computer-readable medium of claim 22, wherein estimating a present lens assembly temperature is responsive to a heat generating element time constant.

30. The computer-readable medium of claim 29, wherein the heat generating element time constant is derived from empirical data.

31. The computer-readable medium of claim 29, wherein the heat generating element time constant is calculated.

32. The computer-readable medium of claim 22, wherein estimating a present lens assembly temperature is responsive to an ambient temperature.

33. The computer-readable medium of claim 32, wherein the ambient temperature is estimated responsive to the first input responsive to the heat generating element.

34. The computer-readable medium of claim 32, wherein the ambient temperature is estimated responsive to a heat generating element time constant.

35. The computer-readable medium of claim 32, wherein the ambient temperature is estimated responsive to the second input responsive to the heat generating element.

36. The computer-readable medium of claim 32, wherein the ambient temperature is estimated responsive to a difference determined from the second time and the first time.

* * * * *